(12) United States Patent
Wen

(10) Patent No.: US 10,190,647 B2
(45) Date of Patent: Jan. 29, 2019

(54) BRAKE DISC

(71) Applicant: Yuan-Hung Wen, Chang Hua County (TW)

(72) Inventor: Yuan-Hung Wen, Chang Hua County (TW)

( * ) Notice: Subject to any disclaimer, the term of this patent is extended or adjusted under 35 U.S.C. 154(b) by 0 days.

(21) Appl. No.: 15/470,407

(22) Filed: Mar. 27, 2017

(65) Prior Publication Data

US 2017/0198774 A1    Jul. 13, 2017

Related U.S. Application Data

(63) Continuation-in-part of application No. 14/863,103, filed on Sep. 23, 2015.

(30) Foreign Application Priority Data

Dec. 5, 2014  (TW) .............................. 103142457 A

(51) Int. Cl.
  *F16D 65/12*   (2006.01)
  *F16D 65/02*   (2006.01)

(52) U.S. Cl.
  CPC ........... *F16D 65/12* (2013.01); *F16D 65/128* (2013.01); *F16D 65/123* (2013.01); *F16D 2065/1312* (2013.01); *F16D 2065/1316* (2013.01); *F16D 2065/1364* (2013.01); *F16D 2065/1392* (2013.01)

(58) Field of Classification Search
  CPC ................... F16D 65/12; F16D 65/123; F16D 2065/1312; F16D 2065/1368
  See application file for complete search history.

(56) References Cited

U.S. PATENT DOCUMENTS

| 4,844,206 A | * | 7/1989 | Casey | .................... | F16D 55/40 |
| | | | | | 188/18 A |
| 7,374,023 B2 | | 5/2008 | Yamamoto | | |
| 7,762,379 B2 | * | 7/2010 | Fujita | ..................... | F16D 65/12 |
| | | | | | 188/218 XL |

(Continued)

FOREIGN PATENT DOCUMENTS

| DE | 102012009116 A1 | 4/2013 |
| EP | 0959261 A2 | 11/1999 |

(Continued)

*Primary Examiner* — Thomas J Williams
(74) *Attorney, Agent, or Firm* — Muncy, Geissler, Olds & Lowe, P.C.

(57) ABSTRACT

A brake disk includes: an outer disk, being substantially ring-shaped and defining a central axis, an inner annular flange of the outer disk formed with connecting bridges, the connecting bridge having a protruding portion disposed through a disposing hole axially; an inner disk, coaxially disposed in the outer disk and located on a same plane with the outer disk, an outer annular flange of the inner disk formed with recessed portions corresponding to the protruding portions respectively, the protruding portion fittingly engaged with the recessed portion to prevent the inner disk from rotating relative to the outer disk, the recessed portion and the protruding portion having a gap therebetween; a plurality of positioning members, each positioning member disposed through the disposing hole to restrain the outer and inner disks from moving relatively axially; wherein the outer and inner disks are axially non-overlapping.

2 Claims, 4 Drawing Sheets

(56) References Cited

U.S. PATENT DOCUMENTS

| | | | |
|---|---|---|---|
| 7,789,206 B2 | 9/2010 | Carminati et al. | |
| D661,633 S | 6/2012 | Shinagawa | |
| 8,387,760 B2 | 3/2013 | Gherardi et al. | |
| D693,280 S | 11/2013 | Shinagawa | |
| D721,309 S | 1/2015 | Moore | |
| 2005/0082125 A1* | 4/2005 | Gehrs | F16D 65/12 188/218 XL |
| 2011/0240420 A1 | 10/2011 | Souwa et al. | |
| 2015/0047932 A1 | 2/2015 | Shinagawa | |

FOREIGN PATENT DOCUMENTS

| | | | | |
|---|---|---|---|---|
| EP | 0959261 A3 | * | 5/2002 | ........... F16D 65/123 |
| EP | 2025965 A1 | | 2/2009 | |
| EP | 2128476 A1 | * | 12/2009 | ........... F16D 65/123 |
| EP | 3106702 A1 | * | 12/2016 | ........... F16D 65/123 |
| JP | 2006336670 | | 12/2006 | |
| TW | 335113 | | 6/1998 | |
| TW | 451855 | | 8/2001 | |
| TW | M243588 | | 9/2004 | |
| TW | M271985 | | 8/2005 | |
| TW | M306566 | | 2/2007 | |
| TW | I318188 | | 12/2009 | |
| TW | M386212 | | 8/2010 | |
| TW | M409216 | | 8/2011 | |
| TW | M451445 | | 4/2013 | |
| TW | I404643 | | 8/2013 | |
| TW | M473983 | | 3/2014 | |
| TW | M473984 | | 3/2014 | |
| WO | WO-2009090077 A1 | * | 7/2009 | ........... F16D 65/123 |

\* cited by examiner

BRAKE DISC

CROSS REFERENCE TO RELATED APPLICATIONS

This application is a Continuation-in-Part of co-pending application Ser. No. 14/863,103, filed on Sep. 23, 2015, for which priority is claimed under 35 U.S.C. § 120; and this application claims priority of Application No. 103142457 filed in Taiwan on Dec. 5, 2014 under 35 U.S.C. § 119, the entire contents of all of which are hereby incorporated by reference.

BACKGROUND OF THE INVENTION

Description of the Prior Art

Conventionally, a brake disk is single-piece. An outer ring of the brake disk is for a caliper to clamp thereon to brake, and a central portion of the brake disk is for being comovably connected with a hub. However, in this type of structure, the heat produced during the braking process transmits through the brake disk to the hub and influences the function of a brake.

Therefore, a two-piece brake disk is provided, including an inner disk for being connected with a hub and an outer disk for a caliper to clamp thereon. A center of the outer disk is formed with an opening for the inner disk to be arranged therein, the outer disk and the inner disk are fixed by a plurality of positioning members so as to reduce an amount of heat which is produced during the braking process transmitting to the hub; wherein a brake disk as disclosed in TW451855, TWI318188, TWM473983 and TWM473984 has an outer disk and an inner disk which overlap with each other, and a positioning member is disposed through the outer and inner disks. In this type of brake disk, the outer and inner disks need to be perforated respectively, and a contact area of the outer and inner disks is still great, so the heat insulation effect is not preferable. In addition, the inner and outer disks are fixed to each other only by the positioning member, so the structural strength is weak.

Besides, a floating brake disk as disclosed in TW335113, TWI404643, TWM243588, TWM271985, TWM306566, TWM386212, TWM409216 and TWM451445 is further provided, including an inner disk and an outer disk. The inner disk and the outer disk are provided with a recess or a U-shaped portion respectively, each recess of the inner disk and each recess of the outer disk correspond to each other to form a through hole, and a positioning member is disposed through the through hole to fix the inner and outer disks. This type of brake disk is greater than the above-mentioned brake disks in heat insulation effect. However, because the positioning member is sandwiched between the inner and outer disks, the heat may transmit to the inner disk through the positioning member. In addition, to prevent the inner and outer disks from rotating relative to each other, the recess or the U-shaped portion have to be designed specifically to be engageable with each other. If there are dimensional errors, the brake disk will be unusable. In addition, after being used for a long time, an outer edge of the recess may be abraded seriously, and the structural strength and stability of the brake disk may be influenced.

In addition, US 2015/0047932 disclosed a floating brake disk whose inner disk and outer disk not overlap. However, the opening of the recessed portion of the inner disk is smaller than the maximum width of the protruding portion of the outer disk, so the protruding portion cannot enter the recessed portion along the radial direction. Thus, it is inconvenient that the inner disk can only be installed onto the outer disk along the axial direction.

Besides, US D721309 disclosed an outer disk whose protruding portion has two legs. However, the protruding portion is V-shaped so that the engaging hole is located at the intersection of the two legs. As a result, too much stress concentrates on the intersection of the two legs.

The present invention has arisen to mitigate and/or obviate the afore-described disadvantages.

SUMMARY OF THE INVENTION

The major object of the present invention is to provide a brake disk which has the advantage of a floating brake disk and preferable structural strength.

To achieve the above and other objects, a brake disk is provided, including an outer disk, an inner disk and a plurality of positioning members.

The outer disk is substantially ring-shaped, and a through hole is defined in a center thereof. The through hole defines a central axis, and the central axis defines an axial direction. The outer disk has an inner annular flange, and the inner annular flange surrounds the through hole. The inner annular flange of the outer disk is formed with a plurality of connecting bridges arranged in intervals, and each said connecting bridge extends radially toward the central axis of the through hole. An end of the connecting bridge remote form the inner annular flange of the outer disk has a protruding portion, and a disposing hole is disposed axially through the protruding portion. The protruding portion and the inner annular flange of the outer disk have a predetermined distance radially therebetween.

The inner disk is coaxially disposed in the through hole of the outer disk and located on a same plane with the outer disk, a central portion of the inner disk has a hub connecting portion. The inner disk has an outer annular flange, the outer annular flange is formed with a plurality of recessed portions arranged in intervals, the recessed portions correspond to the protruding portions respectively, the recessed portion is disposed through the inner disk axially, a shape of the recessed portion substantially corresponds to a shape of the protruding portion so that the protruding portion is fittingly engaged with the recessed portion to prevent the inner disk from rotating relative to the outer disk, and the recessed portion and the protruding portion have a gap therebetween; wherein the outer disk and the inner disk are axially non-overlapping.

Each said positioning member is disposed through the disposing hole to restrain the outer and inner disks from moving axially relative to each other.

Thereby, the protruding portion and the recessed portion are engaged with each other to restrain the inner and outer disks from rotating relative to each other, and the protruding portion and the recessed portion will not become non-restrained by each other due to abrasion. In addition, the gap between the protruding portion and the recessed portion can effectively prevent the heat of the outer disk from transmitting to the inner disk. More importantly, the positioning member is disposed through the outer disk and does not contact the inner disk, so the heat of the outer disk can be prevented from transmitting to the inner disk through the positioning member.

The present invention will become more obvious from the following description when taken in connection with the

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
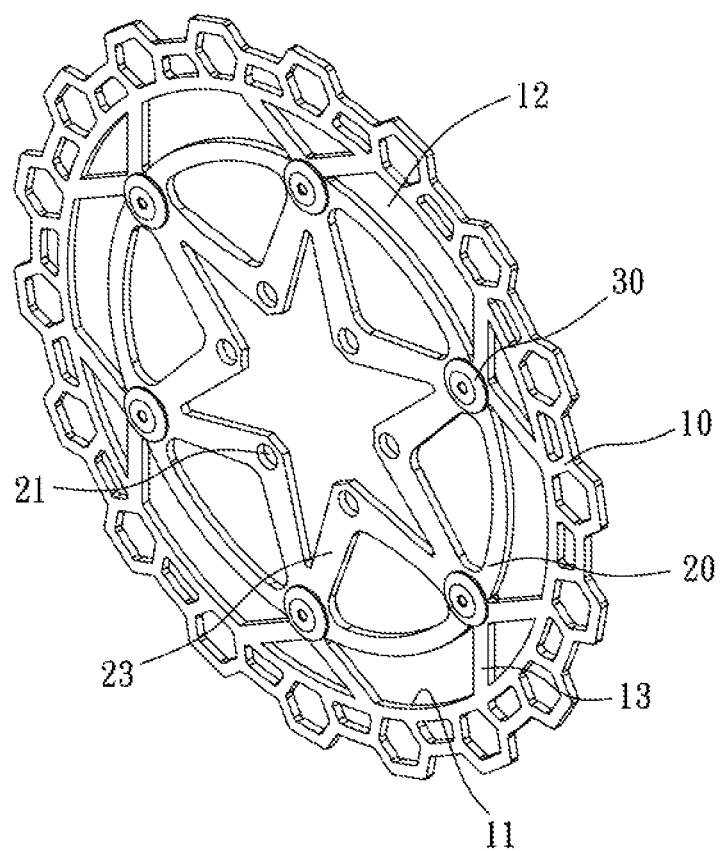
FIG. 1 is a perspective view of the present invention.
Figure 2:
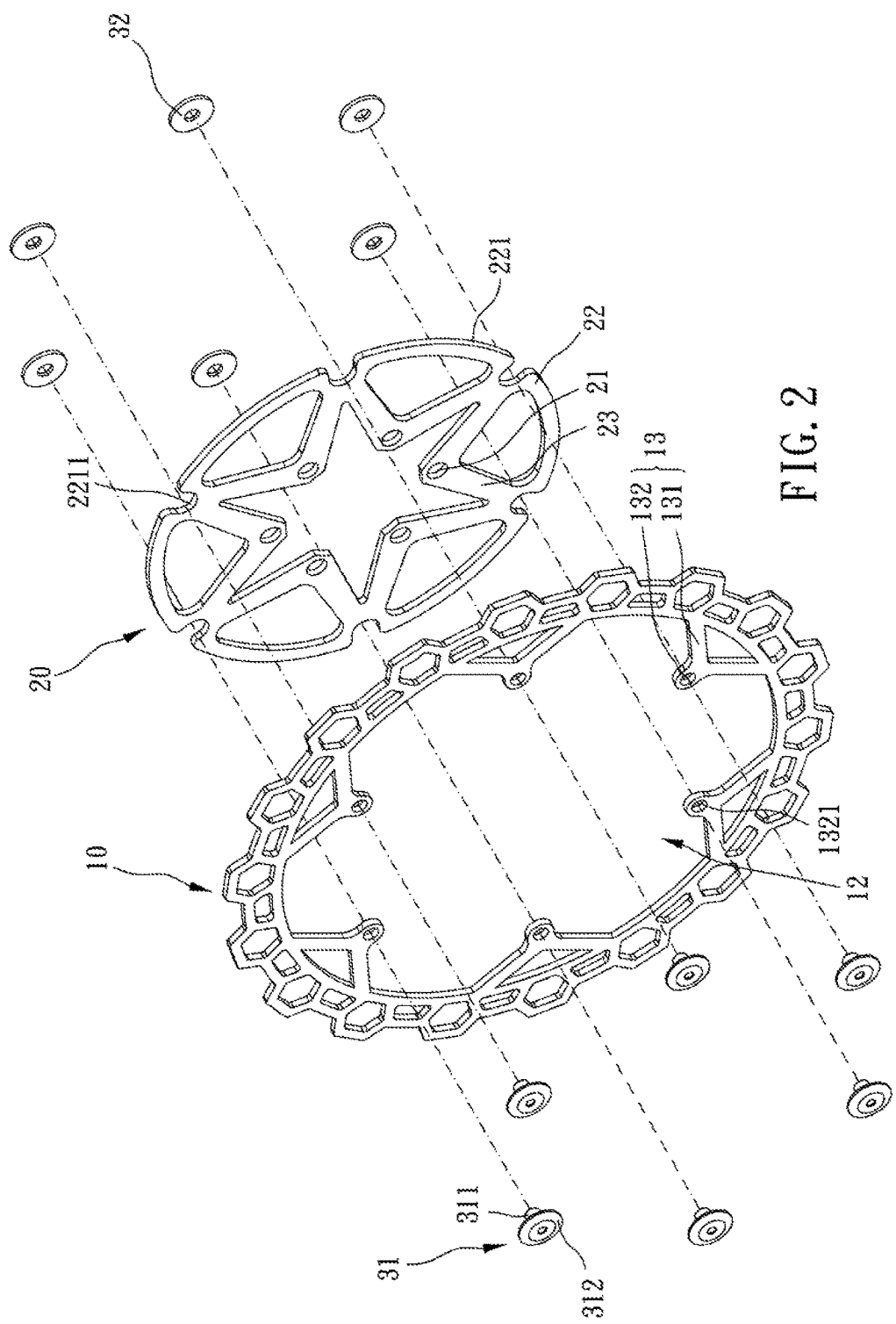
FIG. 2 is a breakdown perspective view of the present invention.
Figure 3:
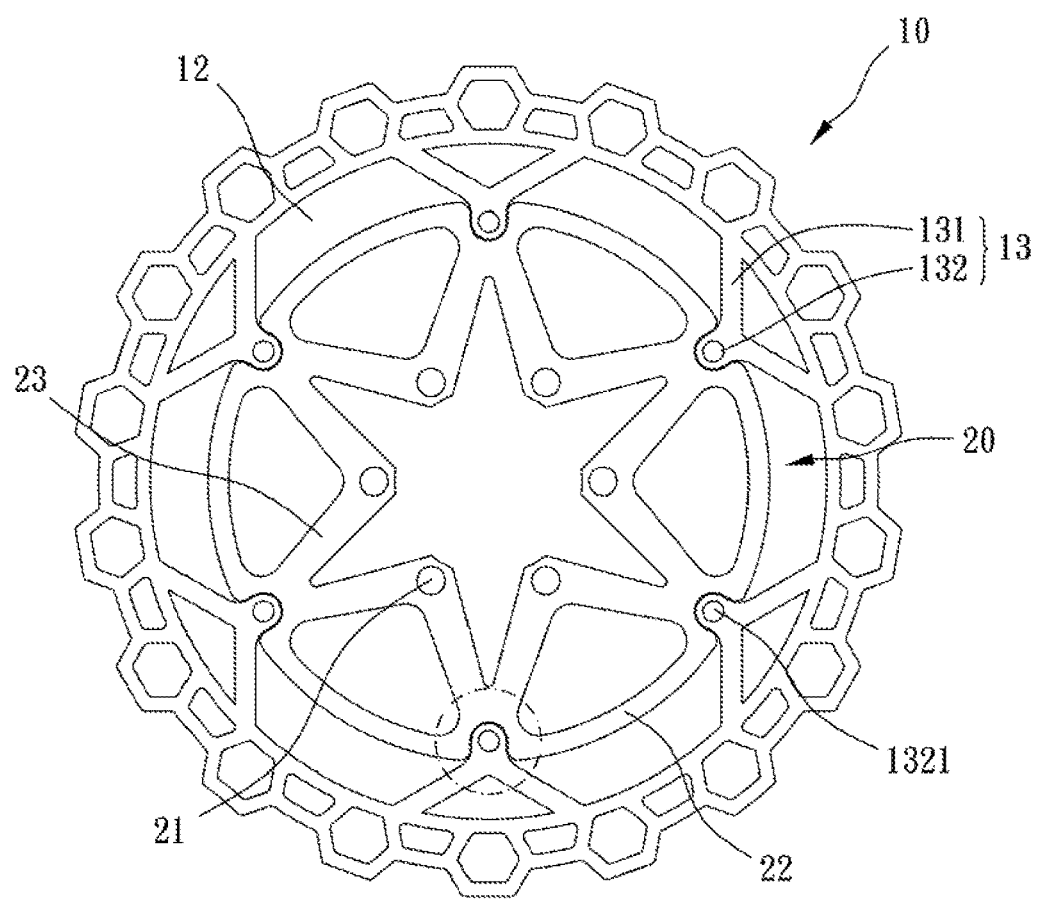
FIG. 3 is a front elevational view of the present invention.
Figure 3A:
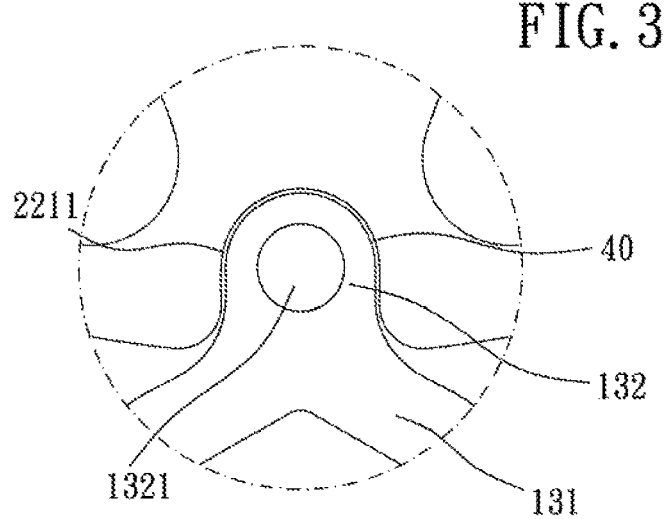
FIG. 3A is a partially-enlarged view of FIG. 3.
Figure 4:
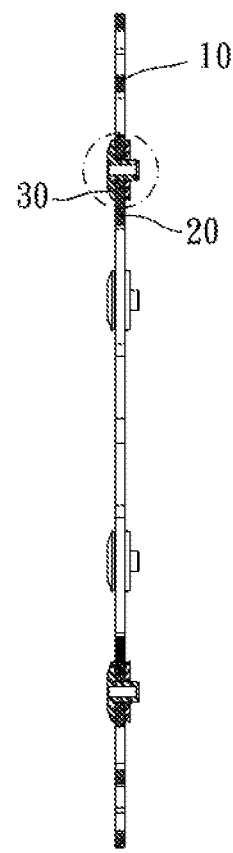
FIG. 4 is a cross-sectional view of the present invention.
Figure 4A:
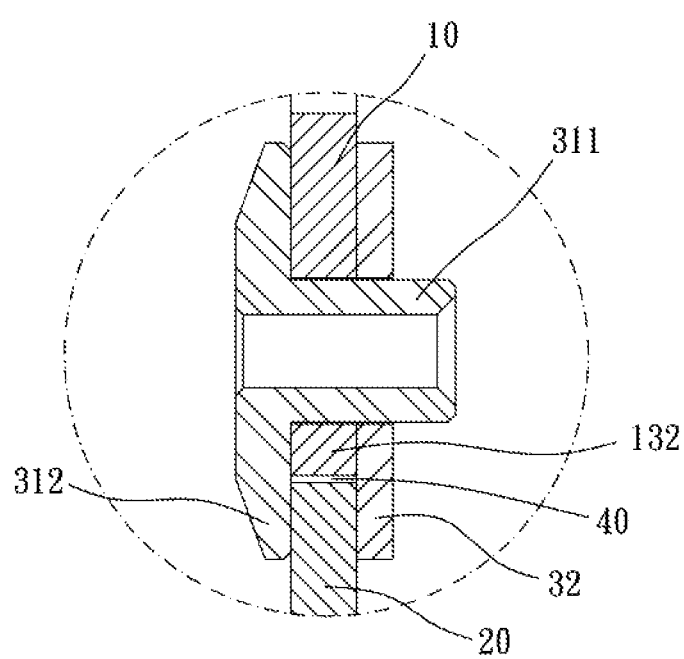
FIG. 4A is a partially-enlarged view of FIG. 4.

Please refer to FIGS. 1 to 5 for a brake disk, including an outer disk 10, an inner disk 20 and a plurality of positioning members 30.

The outer disk 10 is substantially ring-shaped, and a through hole 12 is defined in a center thereof. The through hole 12 defines a central axis, and the central axis defines an axial direction. The outer disk 10 has an inner annular flange 11, and the inner annular flange 11 surrounds the through hole 12. The inner annular flange 11 of the outer disk 10 is formed with a plurality of connecting bridges 13 arranged in intervals, and each said connecting bridge 13 extends radially toward the central axis of the through hole 12. An end of the connecting bridge 13 remote from the inner annular flange 11 of the outer disk 10 has a protruding portion 132, and a disposing hole 1321 is disposed axially through the protruding portion 132. The protruding portion 132 and the inner annular flange 11 of the outer disk 10 have a predetermined distance radially therebetween. In this embodiment, the connecting bridge 13 is substantially Y-shaped and includes two foot portions 131 connected with the inner annular flange 11 of the outer disk 10 and the protruding portion 132. More specifically, the two foot portions 131 divergently extend from the protruding portion 132 toward the inner annular flange 11 of the outer disk 10 so that the connecting bridge 13 is substantially Y-shaped.

The inner disk 20 is coaxially disposed in the through hole 12 of the outer disk 10 and located on a same plane with the outer disk 10, and a central portion of the inner disk 20 has a hub connecting portion 21 (for example, a through hole for a hub to be disposed therein). The inner disk 20 has an outer annular flange 221, and the outer annular flange 221 is formed with a plurality of recessed portions 2211 arranged in intervals. The recessed portions 2211 correspond to the protruding portions 132 respectively, the recessed portion 2211 is disposed through the inner disk 20 axially, a shape of the recessed portion 2211 substantially corresponds to a shape of the protruding portion 132 so that the protruding portion 132 is fittingly engaged with the recessed portion 2211 to prevent the inner disk 20 from rotating relative to the outer disk 10, the recessed portion 2211 and the protruding portion 132 have a gap 40 therebetween; wherein the outer disk 10 and the inner disk 20 are axially non-overlapping. In this embodiment, the inner disk 20 includes an outer annular portion 22, a plurality of bridge portions 23 and the hub connecting portion 21. Each said bridge portion 23 extends from an inner annular flange of the outer annular portion 22 relative to the recessed portion 2211 toward the hub connecting portion 21 and is connected with and between the outer annular portion 22 and the hub connecting portion 21. Preferably, each recessed portion 2211 has an opening toward the outer disk 10 wherein the opening has a width larger than a maximum width of each protruding portion 132 so that the protruding portion 132 is able to enter the recessed portion 2211 along the radial direction. Besides, a number of the bridge portions 23 is twice a number of the recessed portions 2211. A portion of the outer annular portion 22 corresponding to each recessed portion 2211 is divergently extended with two of the bridge portions 23 toward the hub connecting portion 21 so that two of the bridge portions 23 between any two adjacent recessed portions 2211 convergently extend to a specific position of the hub connecting portion 21, such as a same fixing hole shown in the drawings.

Each said positioning member 30 is disposed through the disposing hole 1321 to restrain the outer disk 10 and the inner disk 20 from moving axially relative to each other. In this embodiment, each said positioning member 30 includes a first positioning assembly 31 and a second positioning assembly 32, the first positioning assembly 31 has a rod portion 311 and a head portion 312 located at one of two ends of the rod portions 311, the first positioning assembly 31 is disposed through the through hole 1321 via the rod portion 311 to be connected with the second positioning assembly 32 so that the head portion 312 of the first positioning assembly 31 and the second positioning assembly 32 are located respectively on two opposite sides of the outer disk 10, and the head portion 312 of the first positioning assembly 31 and the second positioning assembly 32 are greater than the recessed portion 2211 and the protruding portion 132 so as to cover the recessed portion 2211 and the protruding portion 132.

Given the above, the whole protruding portion is engaged with the recessed portion, so the inner and outer disks can be prevented from rotating relative to each other effectively and from being non-restrained by each other due to abrasion and provide stable braking effect. In addition, the outer and inner disks are axially non-overlapping, so the heat insulation effect is elevated. The positioning member is disposed through only the outer disk without being disposed through the inner disk, so the positioning member non-contacts with the inner disk; therefore, the heat produced during the braking process can be prevented from transmitting through the positioning member to the inner disk. In other words, the outer and the inner disks have only a gap therebetween, and the gap can help heat-dissipation and prevent the heat from transmitting to the inner disk.

Besides, because the opening of each recessed portion has a width larger than the maximum width of each protruding portion, the protruding portion is able to enter the recessed portion laterally. Thus, the user can make one of the protruding portion enter one of the recessed portion along the radial direction, so other protruding portions can be easier to be inserted into the recessed portions.

While we have shown and described various embodiments in accordance with the present invention, it should be clear to those skilled in the art that further embodiments may be made without departing from the scope of the present invention.

What is claimed is:

1. A brake disk, including:

an outer disk, being substantially ring-shaped, a through hole being defined in a center thereof, the through hole defining a central axis, the central axis defining an axial direction, a first plane being defined as a plane perpendicular to the axial direction, the outer disk having an inner annular flange, the inner annular flange surrounding the through hole, the inner annular flange of the outer disk being formed with a plurality of connecting bridges arranged in intervals, each said connecting bridge extending radially toward the central axis of the through hole, an end of the connecting bridge remote from the inner annular flange of the outer disk having a protruding portion, a disposing hole being disposed axially through the protruding portion, the protruding portion and the inner annular edge of the outer disk having a predetermined distance radially therebetween;

an inner disk, coaxially disposed in the through hole of the outer disk and located on a same plane with the outer disk, a central portion of the inner disk having a hub connecting portion, the inner disk further having an outer annular flange, the outer annular flange being formed with a plurality of recessed portions arranged in intervals, the recessed portions corresponding to the protruding portions respectively, the recessed portion being disposed through the inner disk axially, a shape of the recessed portion substantially corresponding to a shape of the protruding portion so that the protruding portion is fittingly engaged with the recessed portion to prevent the inner disk from rotating relative to the outer disk, the recessed portion and the protruding portion having a gap therebetween, wherein the gap extends continuously along a whole inner fringe of the recessed portion, the protruding portion having a contour completely inside a contour of the recessed portion so that the protruding portion is movable in the recessed portion on the first plane;

a plurality of positioning members, each said positioning member disposed through the disposing hole to restrain the outer disk and the inner disk from moving axially relative to each other;

wherein the outer disk and the inner disk are axially non-overlapping;

wherein the inner disk includes an outer annular portion, a plurality of bridge portions and the hub connecting portion, each said bridge portion extends from an inner annular flange of the outer annular portion relative to the recessed portion toward the hub connecting portion and is connected with and between the outer annular portion and the hub connecting portion, a number of the bridge portions is twice a number of the recessed portions, a portion of the outer annular portion corresponding to each recessed portion is divergently extended with two of the bridge portions toward the hub connecting portion so that two of the bridge portions between any two adjacent recessed portions convergently extend to a specific position of the hub connecting portion, the connecting bridge includes two foot portions which are connected with the inner annular flange of the outer disk and the protruding portion, the two foot portions divergently extend from the protruding portion toward the inner annular flange of the outer disk so that the connecting bridge is substantially Y-shaped;

wherein each recessed portion has an opening toward the outer disk wherein the opening has a width larger than a maximum width of each protruding portion.

2. The brake disk of claim 1, wherein each said positioning member includes a first positioning assembly and a second positioning assembly, the first positioning assembly has a rod portion and a head portion located at one of two ends of the rod portion, the first positioning assembly is disposed through the disposing hole via the rod portion and connected with the second positioning assembly so that the head portion of the first positioning assembly and the second positioning assembly are located respectively on two opposite sides of the outer disk, and both the second positioning assembly and the head portion of the first positioning assembly are greater than the recessed portion and the protruding portion in dimension so that the second positioning assembly and the head portion of the first positioning assembly cover the recessed portion and the protruding portion.

* * * * *